US009708922B1

(12) United States Patent
Davis et al.

(10) Patent No.: US 9,708,922 B1
(45) Date of Patent: Jul. 18, 2017

(54) SEAL RING FOR GAS TURBINE ENGINES

(71) Applicant: United Technologies Corporation, Farmington, CT (US)

(72) Inventors: Timothy M. Davis, Kennebunk, ME (US); Mark J. Rogers, Kennebunk, ME (US); Paul M. Lutjen, Kennebunkport, ME (US); Terence P. Tyler, Jr., Waterboro, ME (US); Michael J. Bruskotter, Cape Neddick, ME (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/162,082

(22) Filed: May 23, 2016

(51) Int. Cl.
| F01D 11/00 | (2006.01) |
| F16J 15/02 | (2006.01) |
| F16J 15/44 | (2006.01) |
| F01D 11/08 | (2006.01) |

(52) U.S. Cl.
CPC ............ F01D 11/005 (2013.01); F01D 11/08 (2013.01); F16J 15/024 (2013.01); F16J 15/44 (2013.01); F05D 2220/32 (2013.01); F05D 2240/55 (2013.01)

(58) Field of Classification Search
CPC ...... F16J 15/0887; F16J 15/44; F01D 11/005; F05D 2240/55
See application file for complete search history.

(56) References Cited

U.S. PATENT DOCUMENTS

| 4,199,151 A * | 4/1980 | Bartos ............... F01D 11/005 277/306 |
| 4,759,555 A * | 7/1988 | Halling ............... F16J 9/18 277/631 |
| 5,188,506 A * | 2/1993 | Creevy ............... F01D 11/005 277/643 |
| 5,249,814 A * | 10/1993 | Halling ............... F16J 15/0887 228/214 |
| 5,716,052 A * | 2/1998 | Swensen ............... F16J 15/0887 277/608 |
| 6,076,835 A | 6/2000 | Ress et al. |
| 6,237,921 B1 | 5/2001 | Liotta et al. |
| 6,352,267 B1 * | 3/2002 | Rode ............... F16J 15/0887 277/631 |
| 6,612,809 B2 | 9/2003 | Czachor et al. |
| 6,942,445 B2 * | 9/2005 | Morris ............... F01D 9/04 415/1 |
| 7,121,790 B2 | 10/2006 | Fokine et al. |

(Continued)

FOREIGN PATENT DOCUMENTS

EP            1177367 B1      8/2003

Primary Examiner — Gilbert Lee
(74) Attorney, Agent, or Firm — Kinney & Lange, P.A.

(57) ABSTRACT

A seal assembly includes a first component, a second component, a first seal, a first shelf, a second shelf, and a second seal. The second component is adjacent to the first component and forms a cavity between the first and second components. The first seal spans the cavity. The first shelf extends axially from the first component and is located between the first seal and a hot gas path. The second shelf extends axially from the second component and is located between the first shelf and the hot gas path; the second shelf together with the first shelf forms a flow channel. The second seal conforms to the first shelf, sealing the flow channel.

20 Claims, 7 Drawing Sheets

(56) References Cited

U.S. PATENT DOCUMENTS

| | | |
|---|---|---|
| 8,192,149 B2 | 6/2012 | Audeon et al. |
| 8,814,173 B2 | 8/2014 | Motzkus et al. |
| 8,827,642 B2 | 9/2014 | Walunj et al. |
| 2006/0082074 A1 | 4/2006 | Synnott et al. |
| 2013/0266416 A1* | 10/2013 | Bergman ............... F01D 25/246 |
| | | 415/1 |
| 2014/0250893 A1 | 9/2014 | Chan et al. |
| 2015/0076390 A1 | 3/2015 | Kloeppner et al. |
| 2015/0226132 A1 | 8/2015 | Roy Thill et al. |
| 2016/0040547 A1 | 2/2016 | Clouse et al. |
| 2016/0084099 A1 | 3/2016 | Davis et al. |

* cited by examiner

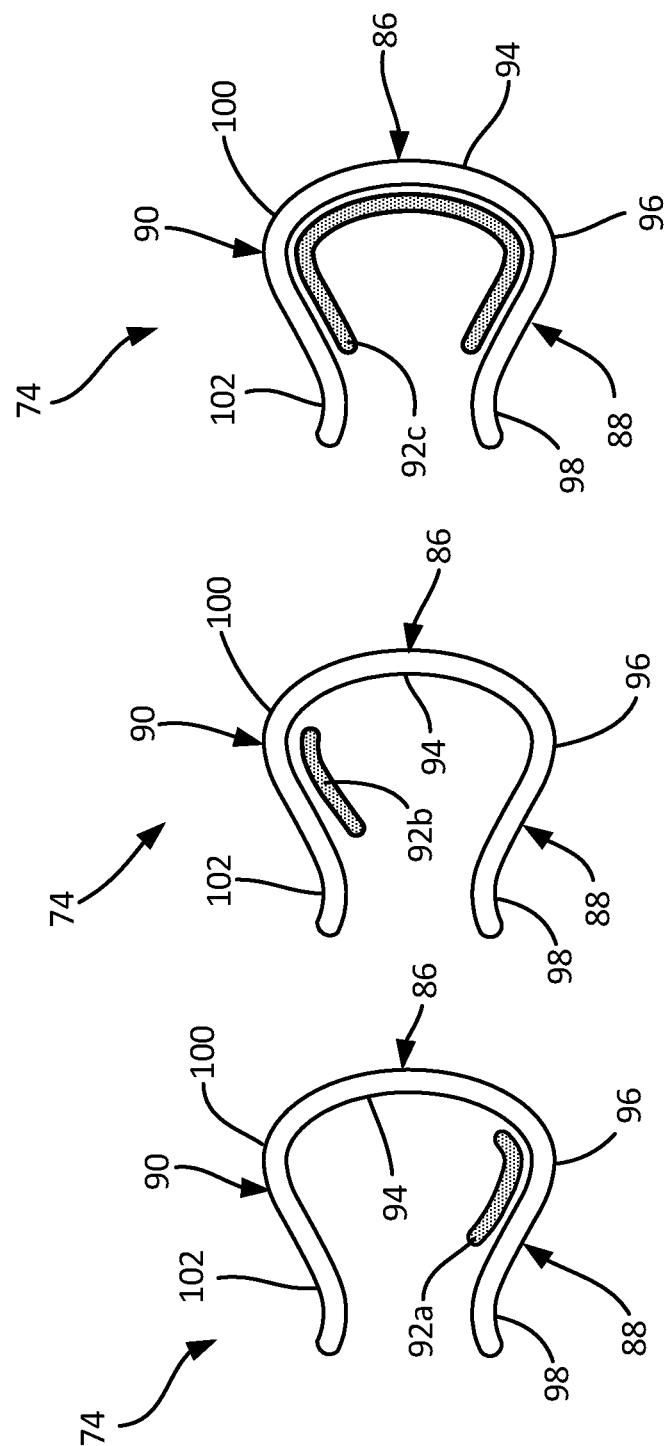

SEAL RING FOR GAS TURBINE ENGINES

BACKGROUND

The present invention relates generally to seals, and more particularly to annular seals suitable for use in gas turbine engines.

Annular seals are used in many applications, such as in pistons of combustion engines, in piping fittings, and in gas turbine engines. Annular seals are often used in gas turbine engines between components, such as vanes and blade outer air seals, to keep operating gasses and cooling gasses separate.

W-seals are a type of seal capable of withstanding high pressures and are designed to expand and contract axially and circumferentially, allowing w-seals to seal cavities between components of gas turbine engines subjected to a variety of conditions. However, w-seals have been known to degrade due to exposure to high temperature, high pressures, and uneven contact surfaces. Heat shields (secondary seals and secondary heat shields) have been used as a solution to this problem by reducing high temperature, high pressure, and/or stepped surfaces, but are still prone to failure and have caused other adverse effects such as negatively impacting blade tip clearance, thereby reducing engine efficiency.

SUMMARY

In one aspect, a seal assembly includes a first component, a second component, a first seal, a first shelf, a second shelf, and a second seal. The second component is adjacent to the first component and forms a cavity between the first and second components. The first seal spans the cavity. The first shelf extends axially from the first component and is located between the first seal and a hot gas path. The second shelf extends axially from the second component and is located between the first shelf and the hot gas path; the second shelf together with the first shelf forms a flow channel. The second seal conforms to the first shelf, sealing the flow channel.

In another aspect, a method of forming a seal includes sealing a cavity formed between a first and second component using a first seal. A flow channel can be formed with a first shelf and a second shelf that are located between the first seal and a hot gas path. The flow channel can be sealed by conforming a second seal to the first shelf.

In another aspect, a deformable annular seal within a gas turbine engine includes a base, a first arm, and a second arm. The base forms a first arcuate portion. The first arm extends outward from the base to form a second arcuate portion and then turns inward to form a third arcuate portion before terminating. The second arm extends outward from the base to form a fourth arcuate portion and then turns inward to form a fifth arcuate portion before terminating.

The present summary is provided only by way of example, and not limitation. Other aspects of the present invention will be appreciated in view of the entirety of the present disclosure, including the entire text, claims and accompanying figures.

BRIEF DESCRIPTION OF THE DRAWINGS

FIG. 4A, FIG. 4B, and FIG. 4C are cross-sectional views of three embodiments of a crushable seal for the seal assembly.

Figure 1:
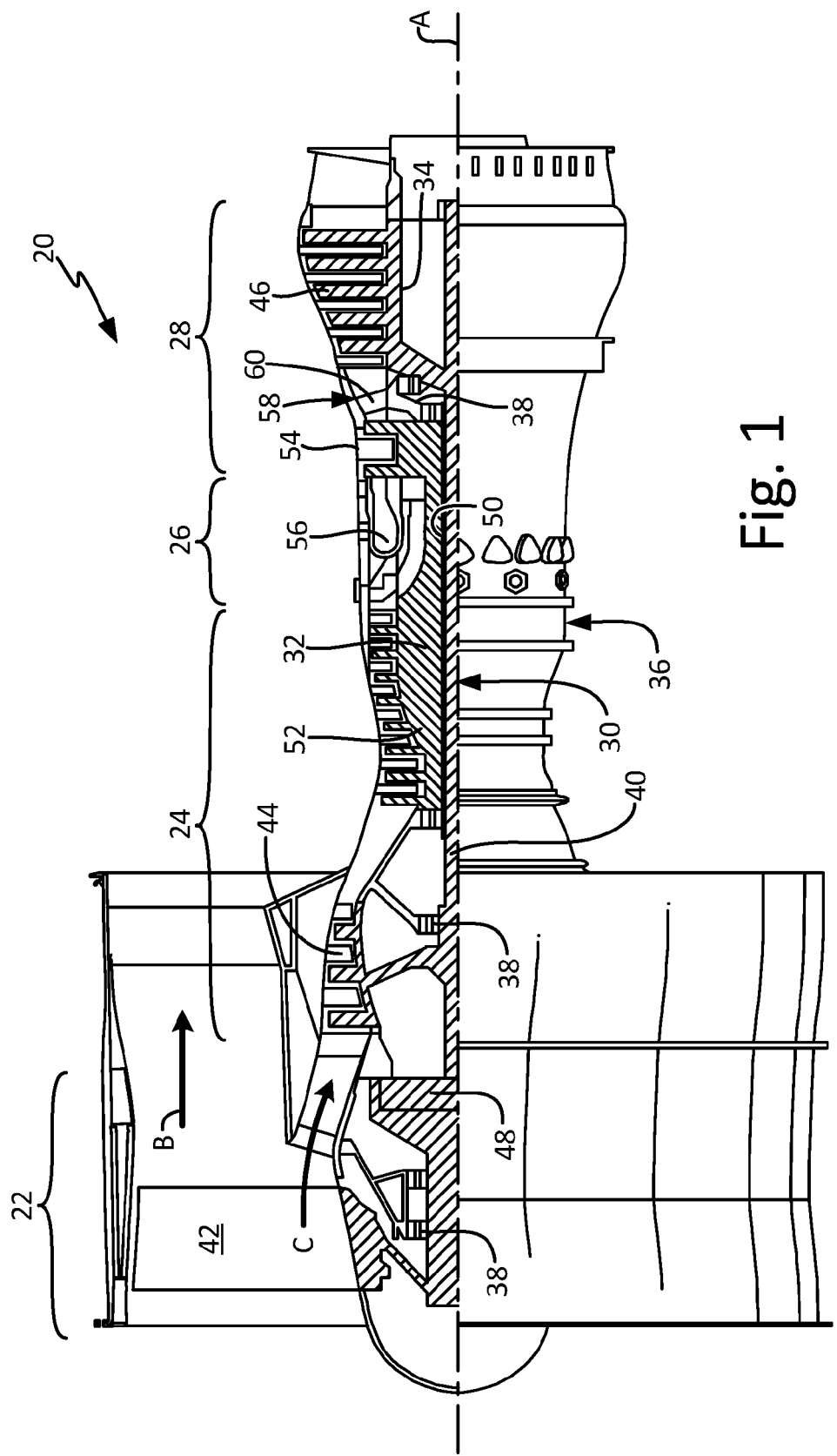
FIG. 1 is a quarter-sectional view of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Heat shields, secondary seals, and secondary heat shields reduce high temperature and high pressure exposure to w-seals; however, many current secondary seal designs rely on resiliency and are therefore prone to failure over time. Some heat shield designs do not seal fore air flow. Other heat shield designs include heat shields that contact the w-seal in a manner that increases leakage, increases pressure drop across the w-seal, and increases wear on the w-seal. These effects can cause the w-seal to become compromised. The seal assembly invention prolongs the life of w-seals by adding a deformable c-seal separated from the w-seal and conforming to a shelf between the w-seal and the gas path.

FIG. 1 is a quarter-sectional view of gas turbine engine 20 that includes fan section 22, compressor section 24, combustor section 26, and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor (HPC) 52 and high pressure turbine 54. In one example, high pressure turbine 54 includes at least two stages to provide a double stage high pressure turbine 54. In another example, high pressure turbine (HPT) 54 includes only a single stage. As used herein, a "high pressure" compressor or turbine experiences a higher pressure than a corresponding "low pressure" compressor or turbine.

The example low pressure turbine (LPT) 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

Figure 2:
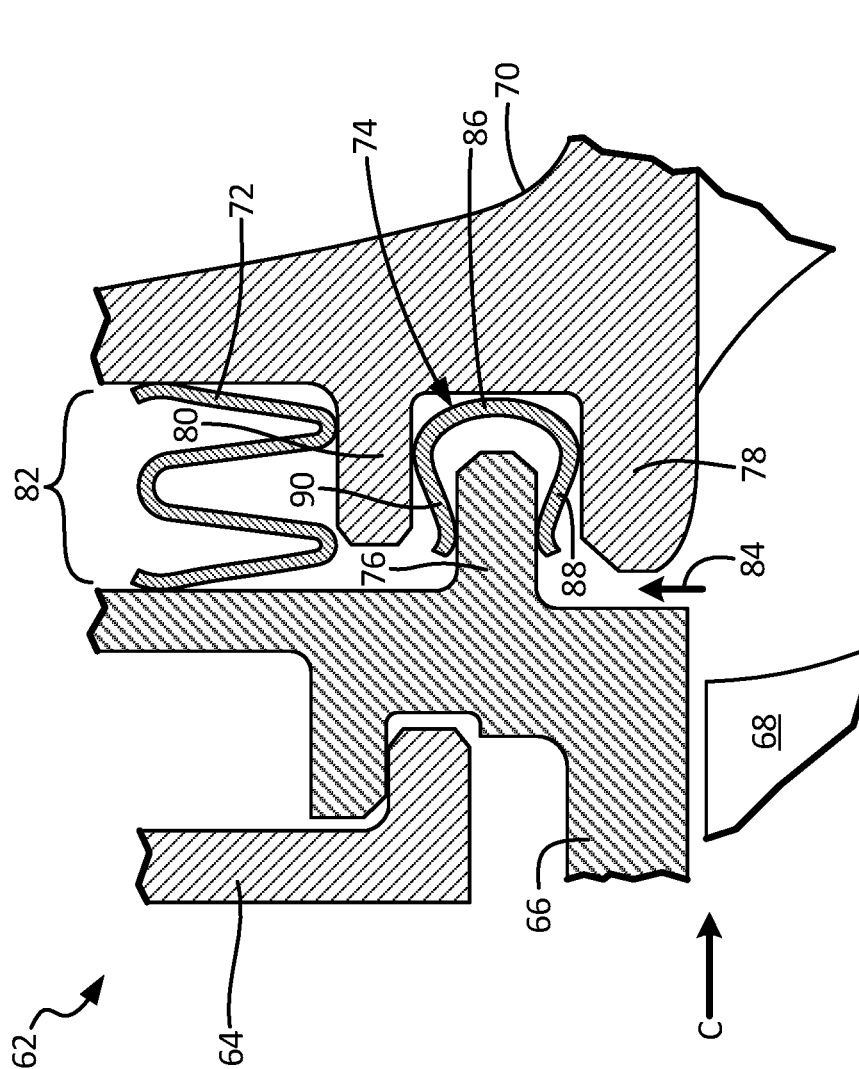
FIG. 2 is a cross-sectional view of an embodiment of a seal assembly.

FIG. 2 is a cross-sectional view of assembly 62, which can be located in high pressure turbine 54 of FIG. 1. Seal assembly 62 includes blade outer air seal (BOAS) support 64, BOAS 66, blade 68, vane 70, w-seal 72, seal ring 74, first shelf 76, second shelf 78, third shelf 80, cavity 82, and flow channel 84. Seal ring 74 includes base 86, first arm 88, and second arm 90. Also shown in FIG. 2 are core flow path C and a representative engine central longitudinal axis A.

BOAS support 64 is a rigid static component of gas turbine engine 20 that supports BOAS 66. BOAS 66 does not rotate, but is not entirely static, as BOAS 66 can shift radially and axially. Moreover, it should be understood that a "static" component in the present context can be installed in an engine of a movable vehicle. BOAS 66 forms a seal for blade 68. Because blade 68 rotates within BOAS 66, a gap must be maintained between BOAS 66 and blade 68 to enable rotation of blade 68. This gap is known in the art as blade tip clearance. Vane 70 is also a non-rotating component supported by a static structure (not shown). Vane 70 is located downstream of BOAS support 64 and BOAS 66, relative to core flow path C.

BOAS 66 includes first shelf 76 which extends axially aft from BOAS 66 towards vane 70, but stopping short of contacting vane 70 in the illustrated position. First shelf 76 can be spaced radially from a tip rub surface of BOAS 66. Vane 70 includes second shelf 78, which extends axially fore from vane 70 towards BOAS 66, but terminates prior to contacting BOAS 66 in the illustrated position. Second shelf 78 can be a part of a platform or end wall of vane 70 with a radially inner side that borders core flow path C. Second shelf 78 is positioned radially away from first shelf 76 (e.g., radially inward of first shelf 76). Vane 70 also includes third shelf 80 that extends axially fore from vane 70, but terminates prior to contacting BOAS 66 in the illustrated position. Third shelf 80 is positioned radially away from first shelf 76 (e.g., radially outward from first shelf 76). BOAS 66, vane 70, and third shelf 80 form cavity 82, which can be fluidly connected to a cooling and pressurization flow source, such as HPC 52, on the radially outward portion of cavity 82.

Together, first shelf 76, second shelf 78, and third shelf 80 along with radially extending faces of BOAS 66 and vane 70 form boundaries of flow channel 84, which can have a serpentine shape when viewed in cross-section. As second shelf 78 does not contact BOAS 66 in the illustrated position, flow channel 84 begins where flow channel 84 is fluidly connected to core flow path C near a cantilevered or distal end of second shelf 78.

In the illustrated embodiment, flow channel 84 continues radially outward from the gap between second shelf 78 and BOAS 66 before turning aft along a radially outward surface of second shelf 78 and a radially inward surface of first shelf 76. Flow channel 84 then turns radially outward along a distal end of first shelf 76 and vane 70 before turning fore and continuing along a radially outward surface of first shelf 76 and a radially inward surface of third shelf 80. Thereafter flow channel 84 turns radially outward again along a distal end of third shelf 80 and a portion of BOAS 66, where flow channel 84 connects to cavity 82.

W-seal 72 is a resilient annular w-type seal having two axially outer arms for contacting surfaces. W-seal 72 also has multiple convolutions that provide resiliency and allow w-seal to conform to openings of varying sizes. In other embodiments, w-seal 72 can be a different type of annular seal, such as a finger seal. W-seal 72 spans cavity 82 contacting radially extending surfaces of BOAS 66 and vane 70, and the radially inner convolutions of w-seal 72 contact a radially outer surface of third shelf 80.

Seal ring 74 is a split-hoop annular seal made of a thin (e.g., 0.005 to 0.020 inches [0.125 to 0.5 mm]) sheet metal having a high temperature resistance, low-strength, and high-ductility, such as a cobalt alloy. Seal ring 74 can be made of other materials in other embodiments. Seal ring 74 includes base 86, which has a first arcuate portion. Base 86 connects to first arm 88 and second arm 90 at outward (relative to seal ring 74) extensions of base 86. First arm 88 and second arm 90 also form arcuate portions that turn inward (relative to seal ring 74), before turning outward and terminating. First arm 88 has a second arcuate portion that is convex (pointing outward) relative to seal ring 74, and first arm 88 has a third arcuate portion that is concave (pointing inward) relative to seal ring 74. Second arm 90 has a fourth arcuate portion that is convex (pointing outward) relative to seal ring 74, and second arm 90 has a fifth arcuate portion that is concave (pointing inward) relative to seal ring 74. The second arcuate portion of first arm 88 and the fourth arcuate portion of second arm 90 have an axis that is approximately perpendicular to an axis of base 86. The arcuate portions are discussed further in FIGS. 3A-3C.

Seal ring 74 is positioned to surround the distal end of first shelf 76. Base 86 is illustrated as not contacting the aft termination of first shelf 76, prior to initial engine startup, but can contact the aft termination of first shelf 76 following initial engine startup. First arm 88 contacts a radially inner surface of first shelf 76 and second arm contacts a radially outer surface of first shelf 90. First arm 88 also contacts a radially outer surface of second shelf 78 and second arm 90 contacts a radially inner surface of third shelf 80. First arm 88 and second arm 90 are not shown as contacting radially extending surfaces of BOAS 66 in FIG. 2; however, first arm 88 and second arm 90 can contact radially extending surfaces of BOAS 66 in operation. Similarly, base 86 does not contact vane 70 in FIG. 2, but base 86 can contact vane 70 in operation.

Though flow channel 84 is connected to cavity 82, w-seal 72 forms a seal in cavity 82 that limits flow along flow channel 84. Further, seal ring 74 creates a seal in flow channel 84 further limiting flow along flow channel 84 toward cavity 82.

During assembly, seal ring 74 can be installed around first shelf 76. Vane 70 can then be installed, enclosing seal ring 74. Thereafter, w-seal 72 can be installed in a state where w-seal is expanded by BOAS shelf 76 and compressed by BOAS 66 and vane 70 forming a seal of cavity 82 while seal ring 74 engages first shelf 76, second shelf 78, and third shelf 80. Installation may occur in other sequences.

Then, at initial start-up of gas turbine engine 20, a large pressure differential is created within gas turbine engine 20 that forces BOAS 66 and vane 70 radially inward until BOAS 66 is seated on BOAS support 64 and vane 70 is seated on its support or hook (not shown). As BOAS 66 and vane 70 move radially inward, first shelf 76, second shelf 78, and third shelf 80 apply forces on seal ring 74, crushing or plastically deforming seal ring 74 to conform to the shape of first shelf 76, second shelf 78, and third shelf 80, causing seal ring 74 to form a seal in flow channel 84, as described below in further detail. By sealing flow channel 84, seal ring 74 thermally protects w-seal 72 from core flow path C and protects w-seal 72 from debris from core flow path C. In some prior art designs, the BOAS rests on the Vane platform or rests on a high-strength seal that sits radially on the vane platform. Both of these radial positioning designs for supporting the BOAS cause additional radial stack-up tolerance, negatively affecting blade tip clearance. By seating BOAS 66 on BOAS support 64 and because seal ring 74 is crushed by first shelf 76 (reducing the impact of seal ring 74 on the position of first shelf 76 and BOAS 66), BOAS support 64 is the primary radial positioner of BOAS 66, which improves clearance between the tip of blade 68 and BOAS 66.

Also, because w-seal 72 is thermally protected, w-seal 72 can be made of a material having a higher strength than a w-seal that is exposed to core flow path C, increasing the longevity of w-seal 72. Seal ring 74 also reduces the pressure differential across w-seal 72, which can improve the durability of w-seal 72. By sealing flow channel 84, seal ring 74 helps the secondary or cooling flow maintain a minimum pressure so that cooling air continues to flow through the turbine components (e.g. BOAS and vane) if the primary seal (e.g., w-seal 72) fails.

Some secondary seals in the prior art rely on resiliency of secondary seals to maintain a seal, and in doing so apply forces to BOAS and vanes, which can adversely affect tip clearance between blades and BOASs. Because seal ring 74 conforms to first shelf 76, second shelf 78, and third shelf 80 to create a secondary seal, seal ring 74 does not affect tip clearance between blade 68 and BOAS 66, helping to maintain engine efficiency while still protecting w-seal 72 and providing a back-up seal should the primary seal fail. In other embodiments, seal ring 74 can conform to only one shelf, such as first shelf 76.

Once seal ring 74 deforms, conforming to first shelf 76, second shelf 78, and third shelf 80, seal ring 74 is not able to rotate within flow channel 84 due to friction applied to seal ring 74 by first shelf 76, second shelf 78, and third shelf 80, and because seal ring 74 is contained by first shelf 76, second shelf 78, and third shelf 80. Because seal ring 74 is well contained, seal ring 74 is therefore not likely to liberate upon failure from flow channel 84 and enter core flow path C. Additionally, seal ring 74 helps prevent w-seal 72 from liberating and entering core flow path C. Further, seal ring 74 is less likely to deteriorate because seal ring 74 can be made of a metal having a high temperature resistance, increasing component life of seal ring 74 and further decrease the possibility of seal ring 74 entering core flow path C.

Additionally, because first shelf 76 axially inserts into second shelf 78 and third shelf 80, seal ring 74 can slide with first shelf 76 as first shelf 76 moves axially relative to second shelf 78 and third shelf 80. The ability of seal ring 74 to slide with first shelf 76 is further increased because ring 74 can be made of a metal having a low wear resistance, such as a cobalt alloy. The ability to slide within flow channel 84 enables seal ring 74 to avoid flexing to maintain a seal of flow channel 84. By reducing flexing and cyclic loading on seal ring 74, the likelihood that seal ring 74 will suffer from failure due to fatigue is reduced. However, because seal ring 74 is made of a high-ductility material, such as a cobalt alloy, seal ring 74 is able to withstand large plastic deformation without fracturing and relatively large cyclic strain without fatiguing, should cyclic loading occur.

In some applications of gas turbine engines, it is desirable to group vanes to reduce manufacturing costs. Seal ring 74 works well in these applications, because seal ring 74 is able to deform circumferentially to seal gaps between groups of vanes or BOAS. Though beneficial to turbines utilizing groups of vanes or blades, seal ring 74 still provides benefits described above in engines having singlet segmented components. Base 86 of seal ring 74 includes arcuate portion 94. First arm 88 includes arcuate portions 96 and 98. Second arm 90 includes arcuate portions 100 and 102.

Base 86 forms arcuate portion 94 that is convex (pointing outward) relative to seal ring 74. First arm 88 forms second arcuate portion 96 that turns inward or is convex (pointing outward) relative to seal ring 74. Thereafter, first arm 88 continues, turning outward, and forming third arcuate portion 98 that is concave (pointing inward) relative to seal ring 74, before terminating. Second arm 90 forms fourth arcuate portion 100 that turns inward and is convex (relative to seal ring 74). Thereafter, second arm 90 continues, turning outward, and forming fifth arcuate portion 102 that is concave relative to seal ring 74, before terminating. Second arcuate portion 96 and fourth arcuate portion 100 have and axis that is approximately perpendicular to an axis of base 86.

As discussed above, during assembly, seal ring 74 can be installed around first shelf 76 and then vane 70 can then be installed, enclosing seal ring 74. More specifically, first arm 88 and second arm 90 can be sized so that distance D1 between third arcuate portion 98 and fifth arcuate portion 102 is smaller than thickness T1 of first shelf 76, so that when seal ring 74 is installed, seal ring 74 must be radially stretched to enclose first shelf 76. The concave shape of third arcuate portion 98 and fifth arcuate portion 102 makes assembly easier, because the surfaces of third portion 98 and fifth arcuate portion 102 that contact first shelf 76 are curved, reducing friction between third arcuate portion 98 and fifth arcuate portion 102 and first shelf 76.

Additionally, first arm 88 and second arm 90 can be sized so that distance D2 between second arcuate portion 96 and fourth arcuate portion 100 is larger than radial distance D3 between second shelf 78 and third shelf 80, so that when vane 70 is installed, seal ring 74 must be radially compressed to fit between second shelf 78 and third shelf 80. The convex shape of second arcuate portion 96 and fourth arcuate portion 100 makes assembly easier, because the surfaces of second arcuate portion 96 and fourth arcuate portion 100 that contact second shelf 78 and third shelf 80, respectively, are curved, providing lead-in for ease of assembly and reducing friction between third arcuate portion 98 and second arcuate portion 102 and first shelf 76.

Following installation, and during initial startup, BOAS 66 and vane 70 move radially inward, as described above. This moves first shelf 76, second shelf 78, and third shelf 80 radially inward, which applies forces on seal ring 74, crushing or plastically deforming seal ring 74 to conform to the shape that first shelf 76, second shelf 78, and third shelf 80 take during operation, causing seal ring 74 to form a seal of flow channel 84. In other embodiments, seal ring 74 can be designed to plastically deform during the installation process (i.e. prior to initial startup).

Plastic deformation (or crushing) of seal ring 74 could increase potential for seal ring 74 to fatigue; however, because seal ring 74 is made of a high-ductility material, such as a cobalt alloy, seal ring 74 is well suited to handle cyclic loading, reducing the likelihood that seal ring 74 fails due to fatigue.

Figure 3:
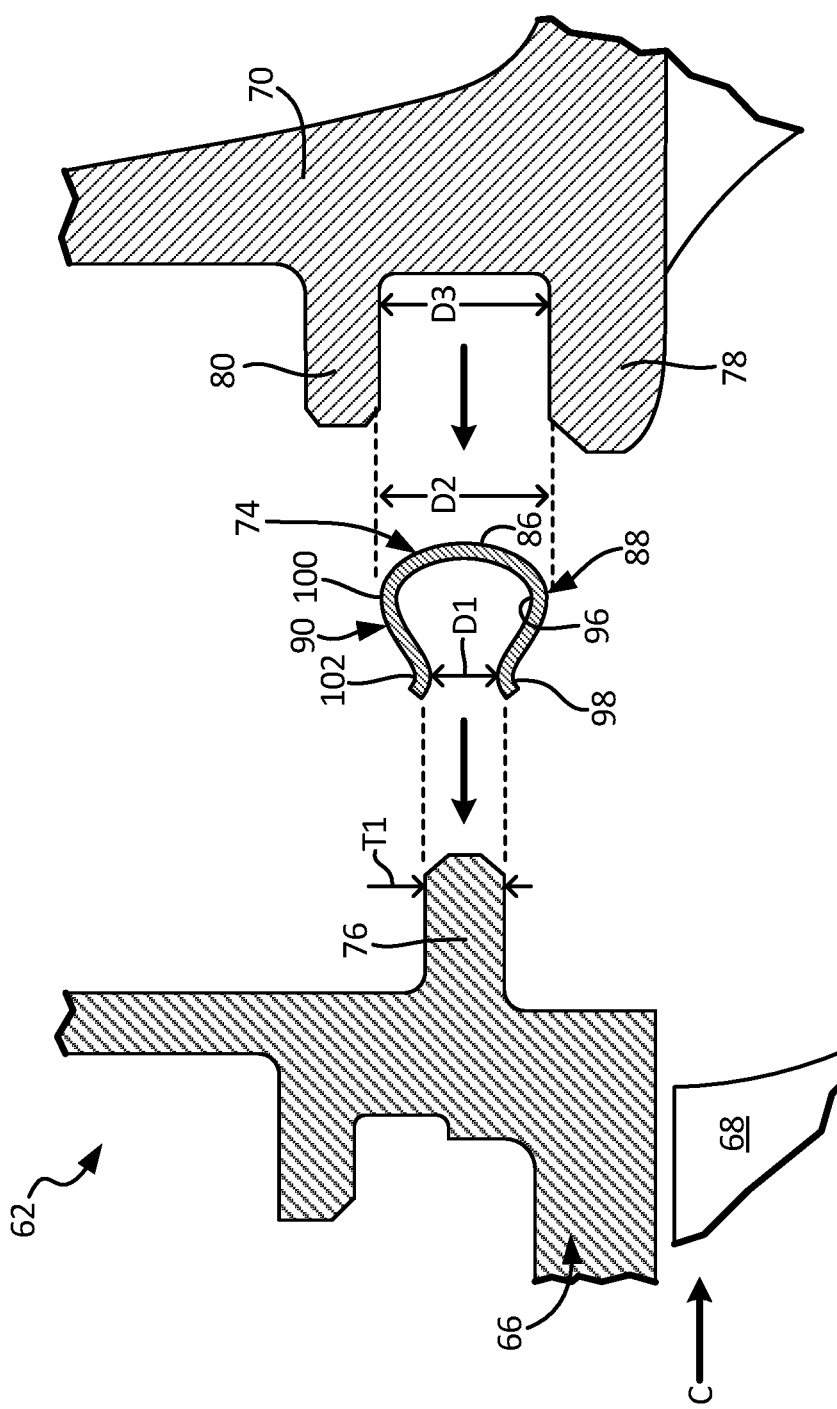
FIG. 3 is a cross-section view of part of the seal assembly of FIG. 2.

FIG. 4A, FIG. 4B, and FIG. 4C are cross-sectional views of seal ring 74. FIG. 4A illustrates seal ring 74 and bridge 92a. FIG. 4B illustrates seal ring 74 and bridge 92b. FIG. 3C illustrates seal ring 74 and bridge 92c.

In the illustrated embodiments, bridges 92a, 92b, and 92c are different embodiments of partial annular seals made of the same material as seal ring 74, such as a thin (e.g., 0.005 to 0.020 inches [0.125 to 0.5 mm]) sheet of a high temperature, low-strength, and high-ductility material, such as a cobalt alloy. However, bridges 92a, 92b, and 92c can be made of other materials in other embodiments. Bridges 92a, 92b, and 92c are connected to one side of a circumferential split in seal ring 74 (as shown in FIG. 4).

Bridge 92a (as shown in FIG. 4A) spans and contacts an inner portion of first arm 88 between second arcuate portion 96 and third arcuate portion 98. Bridge 92b (as shown in FIG. 4B) spans and contacts an inner portion of second arm 90 and spans between fourth arcuate portion 100 and fifth arcuate portion 102, but does not extend to the termination of second arm 90 at fifth arcuate portion 102. Bridge 92c spans and contacts the entire inner perimeter of seal ring 74. Bridges 92a, 92b, and 92c all have cross sections that are complementary to a cross section of seal ring 74, allowing bridges 92a, 92b, and 92c to nest within seal ring 74.

Bridges 92a and 92b provide the benefit of having a small cross-section, reducing manufacturing costs. By spanning and contacting the entire inner surface of seal ring 74, bridge 92c provides the benefit of providing a seal that allow very little gas to pass seal ring 74.

Figure 5:
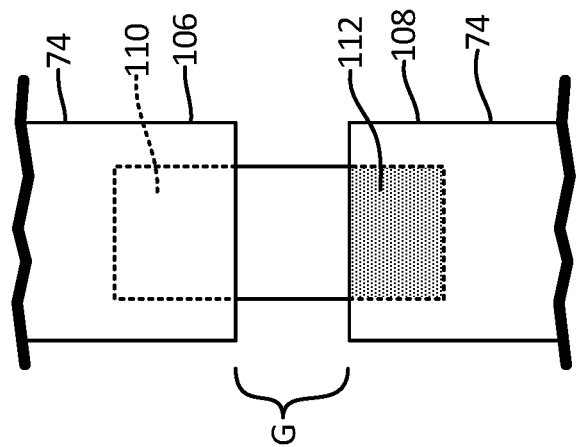
FIG. 5 is a close-up perspective view of one embodiment of a bridge for a crushable seal of the seal assembly.

FIG. 5 is a close-up perspective view of one embodiment of bridge 92 of seal ring 74, which includes free end 106 and fixed end 108. Bridge 92 includes free end 110 and fixed end 112. Also shown in FIG. 5 is gap G.

Gap G is a circumferential gap formed by a circumferential split of seal ring 74. Gap G is spanned by bridge 92 to form a partial seal. Bridge 92 nests within free end 106 and fixed end 108 of seal ring 74, and can extend along selected portion of the inner perimeter of seal ring 74 in various embodiments, as shown in FIGS. 3A-3C. More specifically, fixed end 112 of bridge 92 nests within and is fixedly secured (e.g. welded in a lap joint) to an inner portion of fixed end 108. Free end 110 of bridge 92 nests within, but is not connected to, free end 106 of seal ring 74.

In operation, seal ring 74 contracts and expands as operational pressures and temperatures of gas turbine engine 20 change. Gap G allows for circumferential expansion and contraction of seal ring 74, but gap G can allow gas from core flow path C can pass seal ring 74. Bridge 92 limits gas from bypassing by partially sealing gap G. Because bridge 92 is only fixed to seal ring 74 on one end, bridge 92 allows seal ring 74 to expand and contract freely while still restricting gas from core flow path C from traveling through flow channel 84 and restricting cooling flow from traveling into flow path C.

Figure 6:
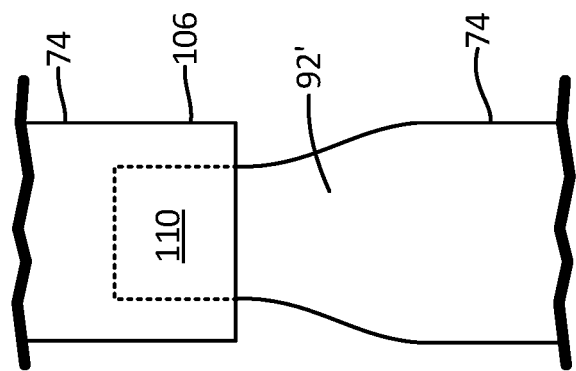
FIG. 6 is a close-up perspective view of another embodiment of a bridge for a crushable seal of the seal assembly.

FIG. 6 is a close-up perspective view of bridge 92'. Also shown are seal ring 74, which includes free end 106, and bridge 92' includes free end 110.

Seal ring 74 is circumferentially split, but includes bridge 92', which is a (transversely) necked down portion of seal ring 74 at free end 110. That is, bridge 92' is an integral part of seal ring 74 that has a cross-sectional shape that is complementary to but smaller than free end 106. This allows bridge 92a' to nest within itself at seal ring free end 106. Free end 110 is not secured within free end 106 but instead forms a sliding lap joint.

In operation, seal ring 74 contracts and expands, as described above. Bridge 92' restricts gas from core flow path C from passing seal ring 74 by nesting within free end 106. Because bridge 92' is free to move within free end 106, seal ring 74 can expand and contract in response to operational conditions. Because bridge 92' is integral to seal ring 74 and is therefore not welded, bridge 92' can save cost. Not welding also provides one less potential point of failure for seal ring 74.

Figure 7:
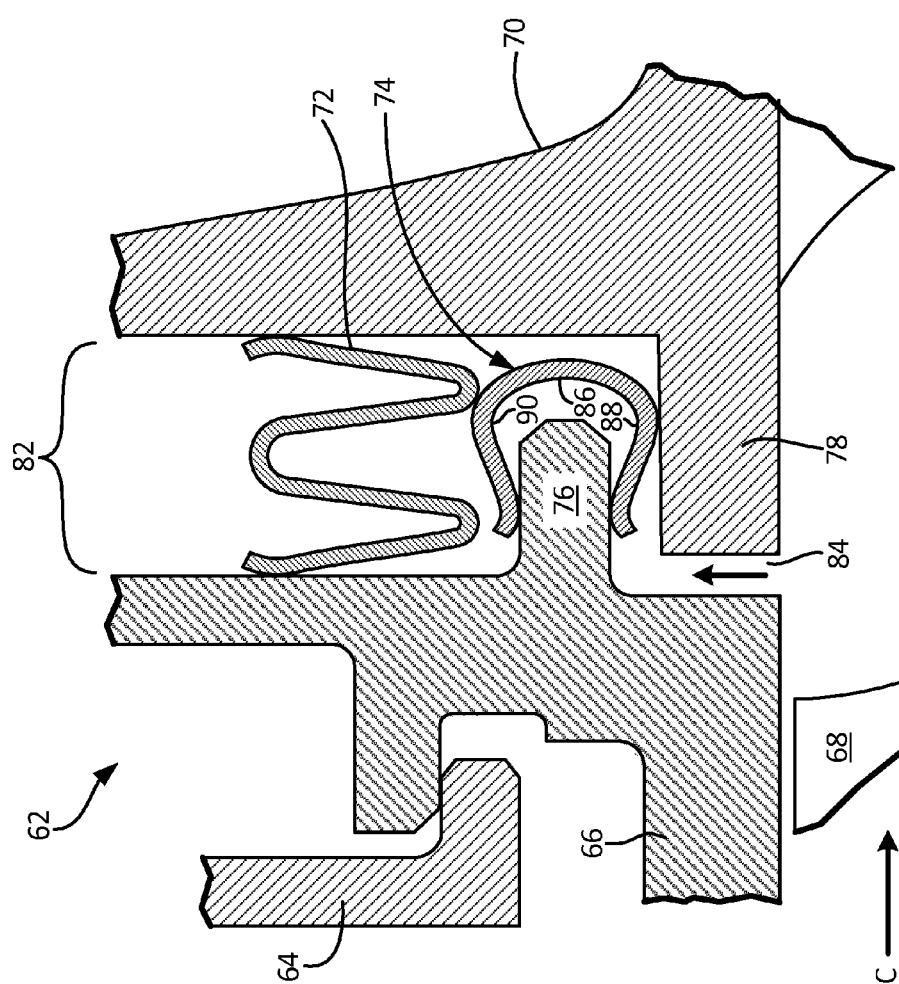
FIG. 7 is a cross-sectional view of another embodiment of a seal assembly.

FIG. 7 is a cross-sectional view of seal assembly 62a, which can be located in high pressure turbine 54 of FIG. 1. Seal assembly 62a includes BOAS support 64, BOAS 66, blade 68, vane 70, w-seal 72, seal ring 74, first shelf 76, second shelf 78, cavity 82, and flow channel 84. Seal ring 74 includes base 86, first arm 88, and second arm 90. Also shown in FIG. 7 are core flow path C and a representative engine central longitudinal axis A.

The components of seal assembly 62a are similar to those of seal assembly 62 described in FIG. 1 above, except for that seal assembly 62a does not include a third shelf. Consequently, w-seal 72 contacts second arm 90 on seal ring 74, as explained in further detail below.

W-seal 72 contacts BOAS 66 and vane 70 to seal cavity 82. First arm 88 of seal ring 74 contacts a radially outer surface of second shelf 78 and a radially inner surface of first shelf 76. Base 86 contacts vane 70, but does not contact BOAS 66 in FIG. 7. However, base 86 can contact BOAS 66 in operation. Second arm 90 contacts a radially outer surface of first shelf 76 and contacts radially inner portions of w-seal 72 (such as radially inner convolutions of w-seal 72).

At initial start-up of gas turbine engine 20, a large pressure differential is created within gas turbine engine 20 that forces BOAS 66 and vane 70 radially inward until BOAS 66 is seated on BOAS support 64 and vane 70 is seated on its support or hook (not shown). The pressure differential also forces w-seal 72 radially inward to contact seal ring 74. As BOAS 66 and vane 70 move radially inward first shelf 76, second shelf 78 and w-seal 72 apply forces on seal ring 74, crushing or plastically deforming seal ring 74 to conform to the shape of first shelf 76, second shelf 78, vane 70, and w-seal 72, sealing flow channel 84. Seal ring 74 therefore seals flow channel 84, thermally protecting w-seal 72 from core flow path C and protecting w-seal 72 from debris from core flow path C. Seal assembly 62a offers additional benefits of not including a third shelf, which saves cost and reduces required radial design space.

Figure 8:
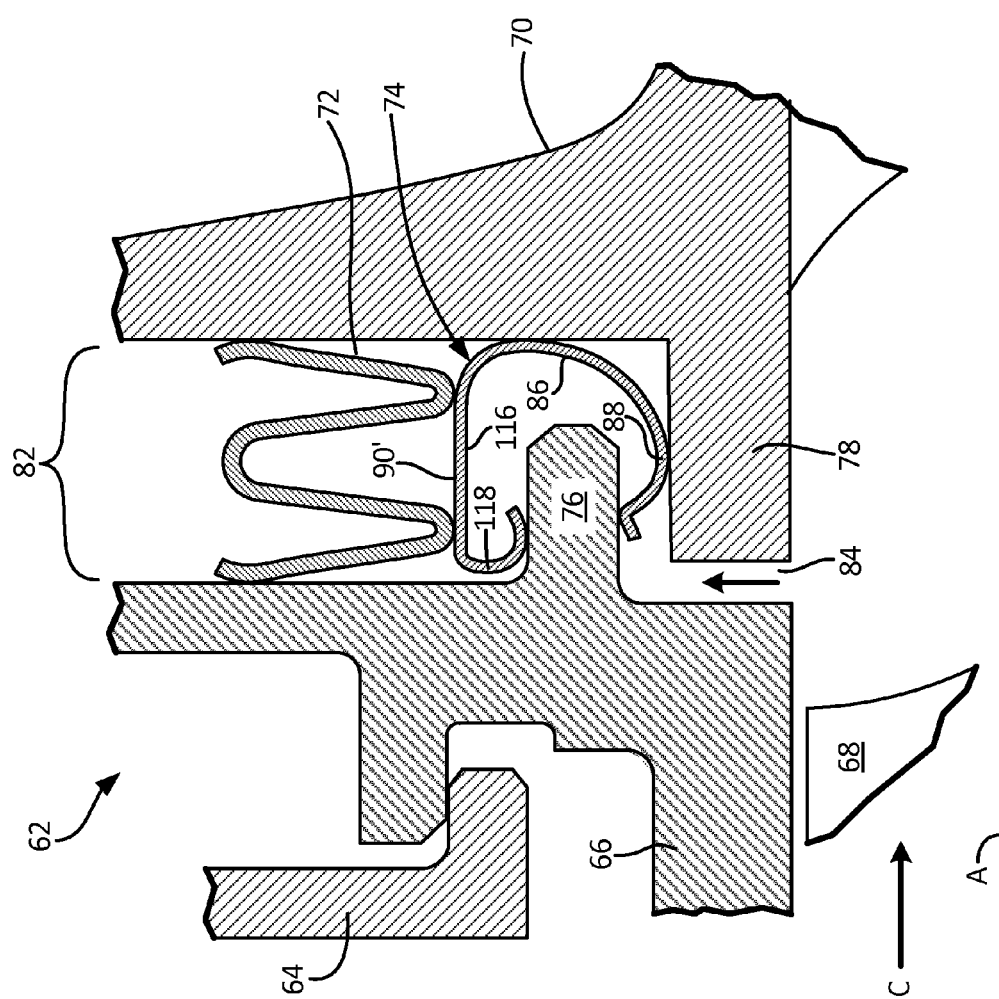
FIG. 8 is a cross-sectional view of yet another embodiment of a seal assembly.

FIG. 8 is a cross-sectional view of seal assembly 62b, which can be located in high pressure turbine 54 of FIG. 1. Seal assembly 62b includes BOAS support 64, BOAS 66, blade 68, vane 70, w-seal 72, seal ring 74', first shelf 76, second shelf 78, cavity 82, and flow channel 84. Seal ring 74' includes base 86, first arm 88, and second arm 90'. Second arm 90' includes flat contact surface 116 and reverse c portion 118. Also shown in FIG. 2 are core flow path C and a representative engine central longitudinal axis A.

The components of seal assembly 62b are similar to those of seal assembly 62a described in FIG. 7 above, except for that second arm 90' of seal ring 74' has a cross-sectional shape configured to provide w-seal 72 with a flat contact surface 116. That is second arm 90' extends fore from base 86 approximately parallel to central longitudinal axis A until reverse c portion. At reverse c portion, second arm 90' curves radially inward briefly before turning aft.

In this embodiment, when w-seal 72 contacts second arm 90' of seal ring 74', w-seal will encounter a predominantly flat cross-sectional surface. The flat surface can reduce wear on the radially inner convolutions of w-seal 72 that occur from contact between w-seal 72 and seal ring 74', increasing component longevity and saving cost. Additionally, the flat surface can help prevent w-seal 72 from rotating within cavity 82.

Discussion of Possible Embodiments

The following are non-exclusive descriptions of possible embodiments of the present invention.

A seal assembly includes a first component, a second component, a first seal, a first shelf, a second shelf, and a second seal. The second component is adjacent to the first component and forms a cavity between the first and second components. The first seal spans the cavity. The first shelf extends axially from the first component and is located between the first seal and a hot gas path. The second shelf extends axially from the second component and is located between the first shelf and the hot gas path; the second shelf together with the first shelf forms a flow channel. The second seal conforms to the first shelf, sealing the flow channel.

The seal assembly of the preceding paragraph can optionally include, additionally and/or alternatively, any one or more of the following features, configurations and/or additional components.

The first seal can be a w-seal, the first component can be a blade outer air seal, and the second component can be a vane.

The second seal cab have a cross sectional shape selected from the group consisting of a C shape and an omega shape.

A third shelf can extend from the second component and can be located between the first shelf and the first seal, and together with the first shelf and second shelf can form the flow channel.

The second seal can have an arcuate cross sectional shape. The second seal can include a first arm that can engage a radially inner side of the first shelf and a radially outer side of the second shelf, and the first shelf and the second shelf can deform the arm causing the arm to conform to the first shelf and the second shelf, sealing the flow channel.

A third shelf can extend from the second component and can be located between the first shelf and the first seal, and together with the first shelf and the second shelf can form the flow channel. A second arm of the second seal can engage a radially outer side of the first shelf and a radially inner side of the third shelf, which can deform the arm causing the arm to conform to the first shelf and the third shelf, sealing the flow channel.

A circumferential split can form a circumferential gap between ends of the second seal. A bridge can connect to the second seal and can span the circumferential gap.

The bridge can be secured to a first end of the second seal and can be free to move relative to a second end of the second seal.

A cross section of the bridge can be complementary to a cross section of the second seal.

A first end of the second seal can have a first end cross section. A second end of the second seal can have a second end cross section that is smaller than the first end cross section, and the second end can be nested in the first end.

The bridge can nest within the second seal.

The first shelf and the second shelf can extend in opposite directions. The first shelf and the second shelf can axially overlap. The first shelf can be radially spaced from the second shelf.

A method of forming a seal includes sealing a cavity formed between a first and second component using a first seal. A flow channel can be formed with a first shelf and a second shelf that are located between the first seal and a hot gas path. The flow channel can be sealed by conforming a second seal to the first shelf.

The method of the preceding paragraph can optionally include, additionally and/or alternatively, any one or more of the following features, configurations, additional components, and/or steps.

A circumferential gap can be formed between a first end and a second end of the second seal. The circumferential gap can be bridged with a bridge.

The second seal can be deformed so that it conforms to the first shelf.

The flow channel can be formed with the first shelf, the second shelf, and a third shelf.

A deformable annular seal within a gas turbine engine includes a base, a first arm, and a second arm. The base forms a first arcuate portion. The first arm extends outward from the base to form a second arcuate portion and then turns inward to form a third arcuate portion before terminating. The second arm extends outward from the base to form a fourth arcuate portion and then turns inward to form a fifth arcuate portion before terminating.

The seal of the preceding paragraph can optionally include, additionally and/or alternatively, any one or more of the following features, configurations and/or additional components.

The first arcuate portion can have an axis that is approximately perpendicular to axes of the second arcuate portion and third curved portion. The second arcuate portion can be convex and the third arcuate portion can be concave.

The base can be configured to plastically deform to conform to a component and to seal a flow channel.

The first arm and the second arm can be configured to plastically deform and conform to the component and seal the flow channel.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For instance, seals and seal assemblies described with respect to embodiments at locations radially outward from a hot gas flow can be readily applied to locations radially inward from the hot gas flow in further embodiments.

The invention claimed is:

1. A seal assembly comprising:
   a first component;
   a second component adjacent to the first component forming a cavity between the first and second components;
   a first seal spanning the cavity;
   a first shelf extending axially from the first component and located between the first seal and a hot gas path;
   a second shelf extending axially from the second component and located between the first shelf and the hot gas path, together with the first shelf forming a flow channel; and
   a second seal comprising:
      a first arm that engages a radially inner side of the first shelf and a radially outer side of the second shelf, wherein the first shelf and the second shelf deform the arm causing the arm to conform to the first shelf and the second shelf, sealing the flow channel.

2. The seal assembly of claim 1, wherein the first seal is a w-seal, wherein the first component is a blade outer air seal, and wherein the second component is a vane.

3. The seal assembly of claim 1, wherein the second seal has a cross sectional shape selected from the group consisting of a C shape and an omega shape.

4. The seal assembly of claim 1 and further comprising:
   a third shelf extending from the second component and located between the first shelf and the first seal, together with the first shelf and second shelf forming the flow channel.

5. The seal assembly of claim 1 and further comprising:
   a third shelf extending from the second component and located between the first shelf and the first seal, together with the first shelf and the second shelf forming the flow channel
   a second arm of the second seal that engages a radially outer side of the first shelf and a radially inner side of the third shelf, which deform the arm causing the arm to conform to the first shelf and the third shelf, sealing the flow channel.

6. The seal assembly of claim 1 further comprising:
   a circumferential split forming a circumferential gap between ends of the second seal; and
   a bridge connected to the second seal and spanning the circumferential gap.

7. The seal assembly of claim 6, wherein the bridge is secured to a first end of the second seal and free to move relative to a second end of the second seal.

8. The seal assembly of claim 7, wherein a cross section of the bridge is complementary to a cross section of the second seal.

9. The seal assembly of claim 6, wherein the bridge nests within the second seal.

10. The seal assembly of claim 1 and further comprising:
    a first end of the second seal having a first end cross section;
    a second end of the second seal having a second end cross section that is smaller than the first end cross section wherein the second end is nested in the first end.

11. The seal assembly of claim 1, wherein:
    the first shelf and the second shelf extend in opposite directions;
    the first shelf and the second shelf axially overlap; and
    the first shelf is radially spaced from the second shelf.

12. The seal assembly of claim 1, wherein the second seal further comprises:
    a second arm, wherein the second arm engages a radially outer side of the first shelf and a radially inner portion of the first seal, sealing the flow channel.

13. A method of forming a seal, the method comprising:
    sealing a cavity formed between a first and second component using a first seal;
    forming a flow channel with a first shelf and a second shelf that are located between the first seal and a hot gas path; and
    sealing the flow channel by conforming a second seal to the first shelf and the second shelf.

14. The method of claim 13 and further comprising:
    forming a circumferential gap between a first end and a second end of the second seal; and
    bridging the circumferential gap with a bridge.

15. The method of claim 13 and further comprising:
    deforming the second seal so that it conforms to the first shelf.

16. The method of claim 13 and further comprising:
    forming the flow channel with the first shelf, the second shelf, and a third shelf.

17. A deformable annular seal within a gas turbine engine, the seal comprising:
    a base forming a first arcuate portion;
    a first arm extending outward from the base to form a second arcuate portion and then turning inward to form a third arcuate portion before terminating; and
    a second arm extending outward from the base to form a flat portion, then turning inward to form a fourth arcuate portion, then turning toward the base to form a fifth arcuate portion before terminating.

18. The deformable annular seal of claim 17, wherein:
the first arcuate portion has an axis that is approximately perpendicular to axes of the second arcuate portion and third curved portion; and
the second arcuate portion is convex and the third arcuate portion is concave.

19. The deformable annular seal of claim 17, wherein the base is configured to plastically deform to conform to a component and to seal a flow channel.

20. The deformable annular seal of claim 19, wherein the first arm and the second arm are configured to plastically deform and conform to the component and seal the flow channel.

* * * * *